J. H. STEVENS.

Fertilizer.

No. 1,599. Reissued Jan. 5, 1864.

Witnesses:
J. W. Coombs
Geo. Reed.

Inventor:
J. H. Stevens
per Munn & Co.
Attys.

No. 1,599.

Jas. H. Stevens Mach. for Spreading Manure.

Reissued Jany. 5. 1864.

UNITED STATES PATENT OFFICE.

JAMES H. STEVENS, OF EAST DURHAM, NEW YORK.

IMPROVEMENT IN MANURE-SPREADERS.

Specification forming part of Letters Patent No. 34,790, dated March 25, 1862; Reissue No. 1,599, dated January 5, 1864.

*To all whom it may concern:*

Be it known that I, JAMES H. STEVENS, of East Durham, in the county of Greene and State of New York, have invented a certain new and useful Improvement in Machines for Spreading Manure; and I do hereby declare the following to be a full, clear, and exact description thereof, reference being had to the annexed drawings, making a part of this specification, in which—

Figure 1:
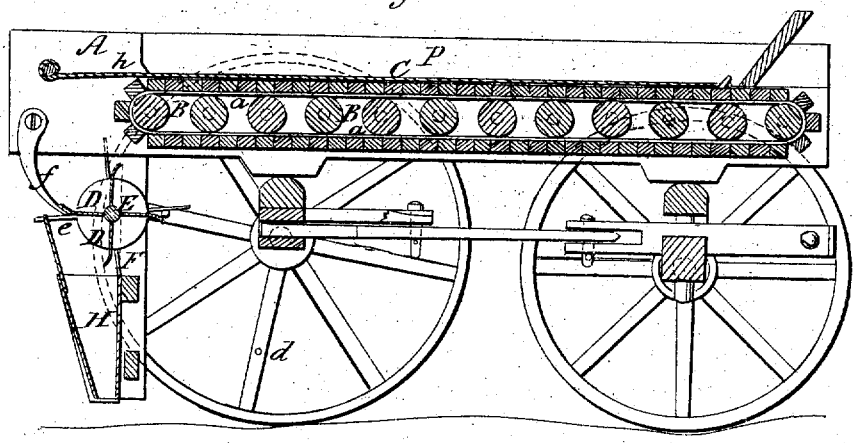
Figure 2:
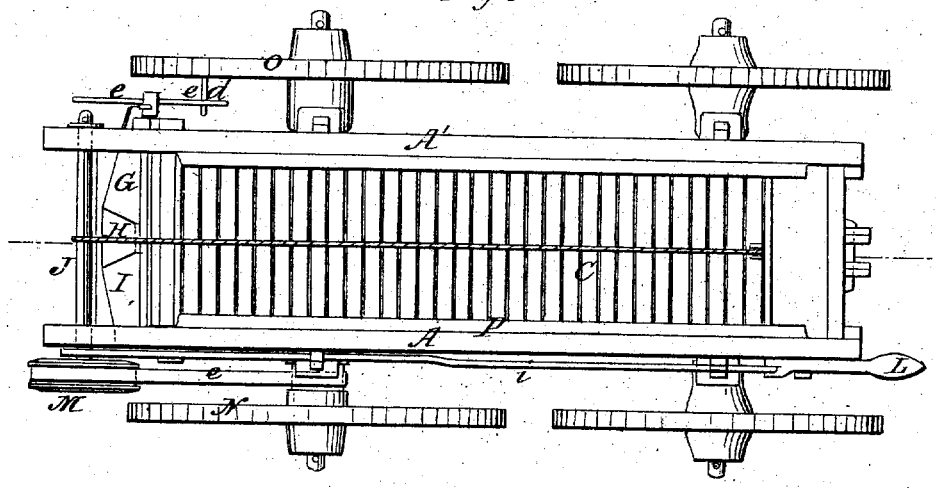
Figure 3:
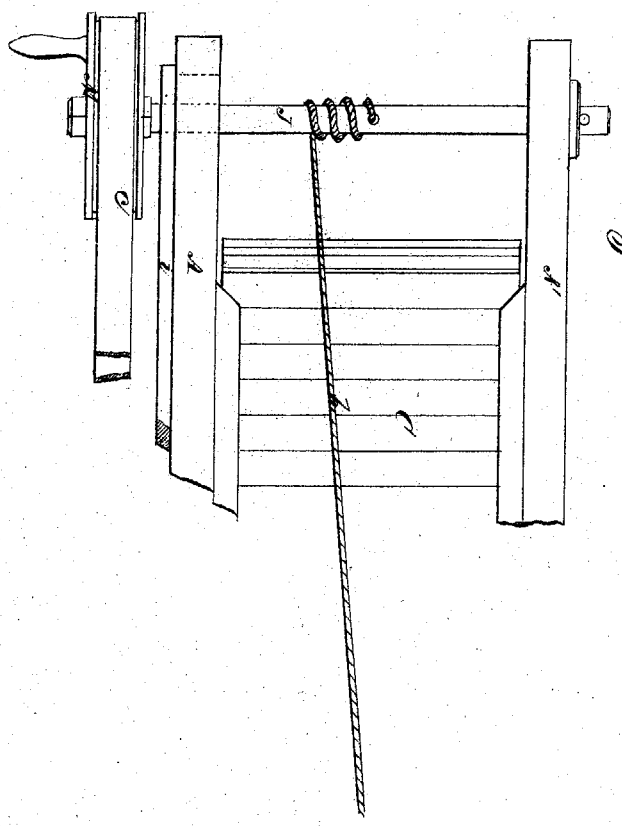

Figure 1 is a longitudinal section of my machine. Fig. 2 is a plan of the same. Fig. 3 is a top view, &c.

Similar letters of reference indicate corresponding parts in the figures.

This invention consists in the employment of an endless flexible belt for the bottom flooring of a wagon-body, and arranging in connection therewith a series of buckets and conducting-tubes, whereby the same wagon that is used for hauling is made to automatically deposit the manure in hills or drills or spread it upon the field, as desired; or, by using a hand-crank, the contents may be deposited in one or several heaps.

To enable others skilled in the art to fully understand and construct my invention, I will proceed to describe it.

A A represent the sides of a common wagon-body, supported in the usual manner upon wheels.

B B represent a series of small rollers, provided with journals at each end, which are fitted in the sides of the wagon-body.

C is an endless belt, composed of slats fitted closely together and attached to flexible bands *a*, encircling the series of rollers B B. It may consist wholly of leather, cloth, or other material.

P P are strips of wood fastened on the inner sides of the wagon-body, and covering the ends of the slats forming the bed, for the purpose of preventing manure from working in between the side boards of the wagon and the slats, and clogging the rollers and the flexible bed.

D D represent four buckets secured upon shaft E, which is journaled in boxes at each end in the framing F, which is supported from the sides of the wagon-body. One end of the shaft E projects through its box, and is provided with four radial arms, *e*, corresponding with the number of buckets.

G H I are conducting-tubes attached to the lower portion of the framing F, immediately under the back end of the endless wagon-bed.

J is a windlass-shaft journaled in the sides of the wagon-body a sufficient distance behind the endless bed to allow the contents of the wagon in unloading to pass between it and the bed. This shaft receives motion from the wagon-wheel N through the medium of a band, *c*, passing over the pulley M on the said shaft, and around the hub of the wheel; or it may be connected by gearing. A rope or chain, *h*, attached to the windlass-shaft, connects with the forward end of the endless bed C, and, as the machine is drawn over the field, imparts a retrograde motion thereto. The end of the shaft J, upon which the pulley (or band-wheel) is secured, rests in a lengthened horizontal mortise, (seen in dotted lines,) in the side, A, and being connected by a rod, *i*, to the foot-lever L at the forward end of the wagon-box, can be moved backward and forward to tighten or loosen the belt driving the windlass-shaft, and thus regulate the movement of the endless bed.

On the inner side of the wheel O are a number of laterally-projecting pins, *d*, which, as the wheel revolves, engage with the radial arms *e* of the buckets, and impart an intermittent motion thereto. The spring *f*, attached to the wagon-body, serves to hold one of the buckets D in a position to receive the falling contents of the wagon while passing from one row of hills to another. As the wagon is drawn over the field, the endless bed being connected to the windlass-shaft, either by gearing or by a cord, as shown, the load is gradually carried toward the rear end of the wagon, where it falls onto the bucket held in position by the spring until one of the pins in the wheel O, striking against one of the radial arms *e*, forces the bucket past the spring, precipitating the contents of the bucket into the conducting-tubes, from whence it passes into the hills. At the same time another bucket is brought in position to receive the falling manure.

When it is desired to use the machine for manuring in the drill, the buckets are removed and the manure allowed to fall from the endless bed directly into the conducting-tubes. Hence, as the wagon progresses over the field, there being three tubes, the manure will be deposited in three continuous rows.

When it is desired to use the machine for top dressing, the conducting-tubes are also removed, when the manure, as the wagon progresses, will fall and be left scattered upon the field.

For unloading manure or other thing in one, two, or several heaps, as desired, the connections of the windlass-shaft and wagon-wheel are also removed, when (the wagon being at rest) the contents, or any desired part thereof, may be turned off by the use of a hand-crank attached to one end of the windlass-shaft J; or the band-wheel M may be used as a hand-crank, a pin or handle being inserted in its outside near the flange. By varying the size of the said band-wheel or of the windlass-shaft a greater or less number of loads to the acre may be put upon the field.

By detaching the distributing apparatus the wagon can be used for all the purposes of an ordinary wagon; or the essential parts of the machine can be used upon a common wagon.

What I claim as new, and desire to secure by Letters Patent, is—

1. The arrangement of the endless flexible bed C, windlass-shaft J, and its connections, in combination with the buckets D, spring *f*, and conducting-tubes G H I, the whole combined and operating in the manner and for the purpose described.

2. The arrangement of the endless flexible bed C, rollers B B, sides A, conducting-tubes G H I, and framing F, the whole supported upon wheels and operating in the manner and for the purpose described.

3. The arrangement of the endless flexible bed C in connection with windlass-shaft J and wheel N, operating in the manner and for the purpose described.

4. The arrangement of the endless flexible bed C in connection with windlass-shaft J and hand-crank, constructed and operating substantially in the manner and for the purpose described.

JAMES H. STEVENS.

Witnesses:
C. G. STEVENS,
CHAS. CORNWALL.